United States Patent [19]
Jordan

[11] 3,874,731
[45] Apr. 1, 1975

[54] INJECTION MOLDED SEATING

[75] Inventor: James A. Jordan, Rochester, Mich.

[73] Assignee: Ford Motor Company, Dearborn, Mich.

[22] Filed: May 4, 1973

[21] Appl. No.: 357,309

[52] U.S. Cl............... 297/452, 297/219, 297/458, 5/353.1
[51] Int. Cl.......................... A47c 31/10, B60n 1/02
[58] Field of Search ........... 297/214, 218, 219, 452, 297/458–461; 5/353.1–353.5

[56] References Cited
UNITED STATES PATENTS

| | | | |
|---|---|---|---|
| 3,329,466 | 7/1967 | Getz et al. .................. | 297/452 X |
| 3,330,600 | 7/1967 | Robertson.................... | 297/219 |
| 3,586,370 | 6/1971 | Bavecki ..................... | 297/219 |
| 3,588,171 | 6/1971 | Rich, Jr. .................... | 297/214 |
| 3,596,989 | 8/1971 | Van Ryn et al................ | 297/219 |
| 3,669,098 | 6/1972 | Meyers ...................... | 297/452 |

Primary Examiner—Casmir A. Nunberg
Attorney, Agent, or Firm—Joseph W. Malleck; Keith L. Zerschling

[57] ABSTRACT

A composite cushion assembly, useful as a padded structure in an automotive vehicle compartment, is disclosed along with the method for making same. The composite assembly has an outer skin formed of flexible-resilient polyvinyl chloride material, the skin forming a cavity into which a foaming composition is injected, the foam upon rigidifying being self-bonded to the skin and providing a material having a resiliency considerably greater than the resiliency of the outer skin. The outer skin is non-stressed during the molding operation with reliance being placed upon an adhering agent to insure a sound bond between the composite materials. The outer skin and foam are defined with openings to receive a supporting structure when the former is mounted thereon; the skin has an integral resilient annular member for installation on the supporting structure by snap-action, the annular member insuring a taunt installed condition for the composite cushion.

2 Claims, 10 Drawing Figures

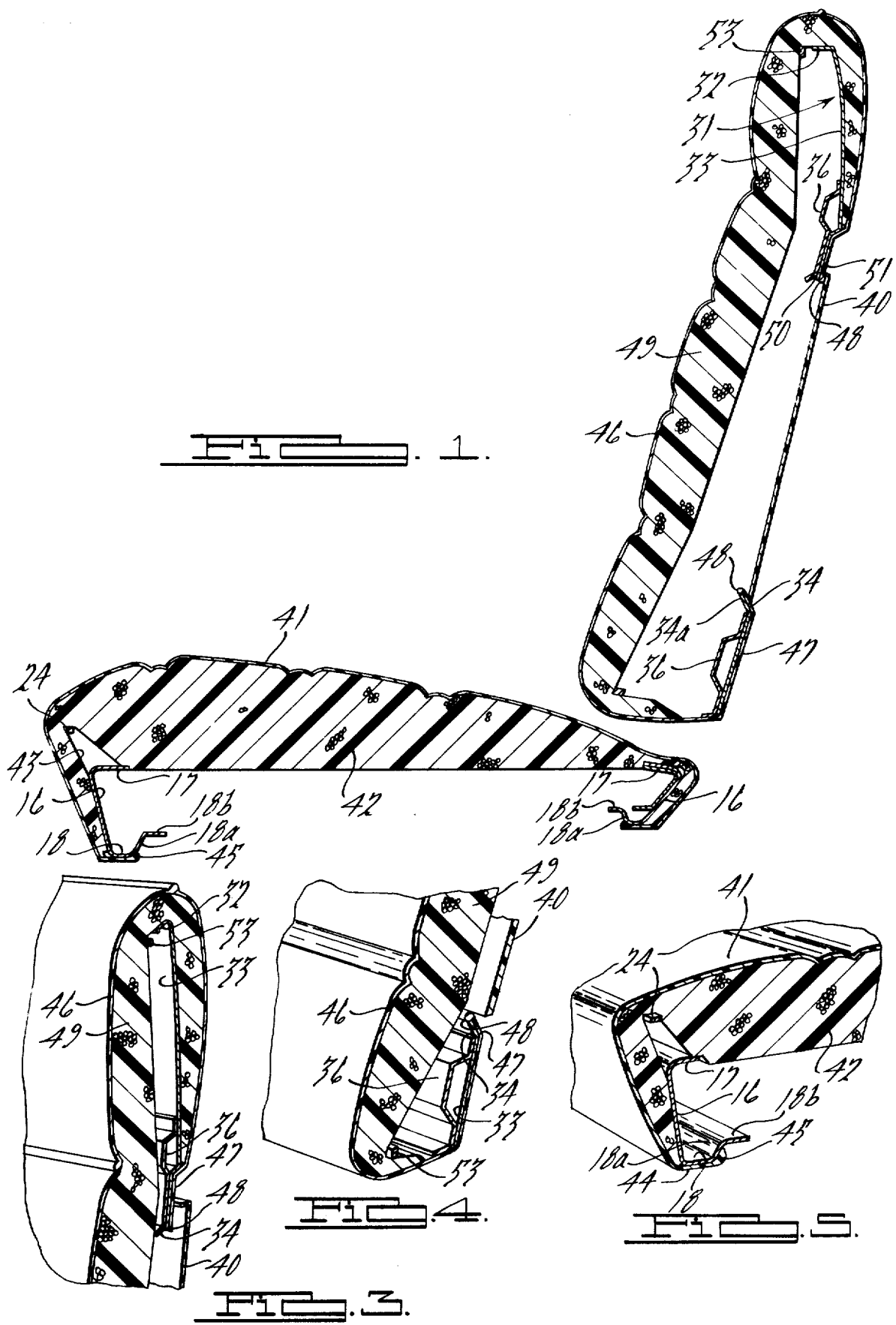

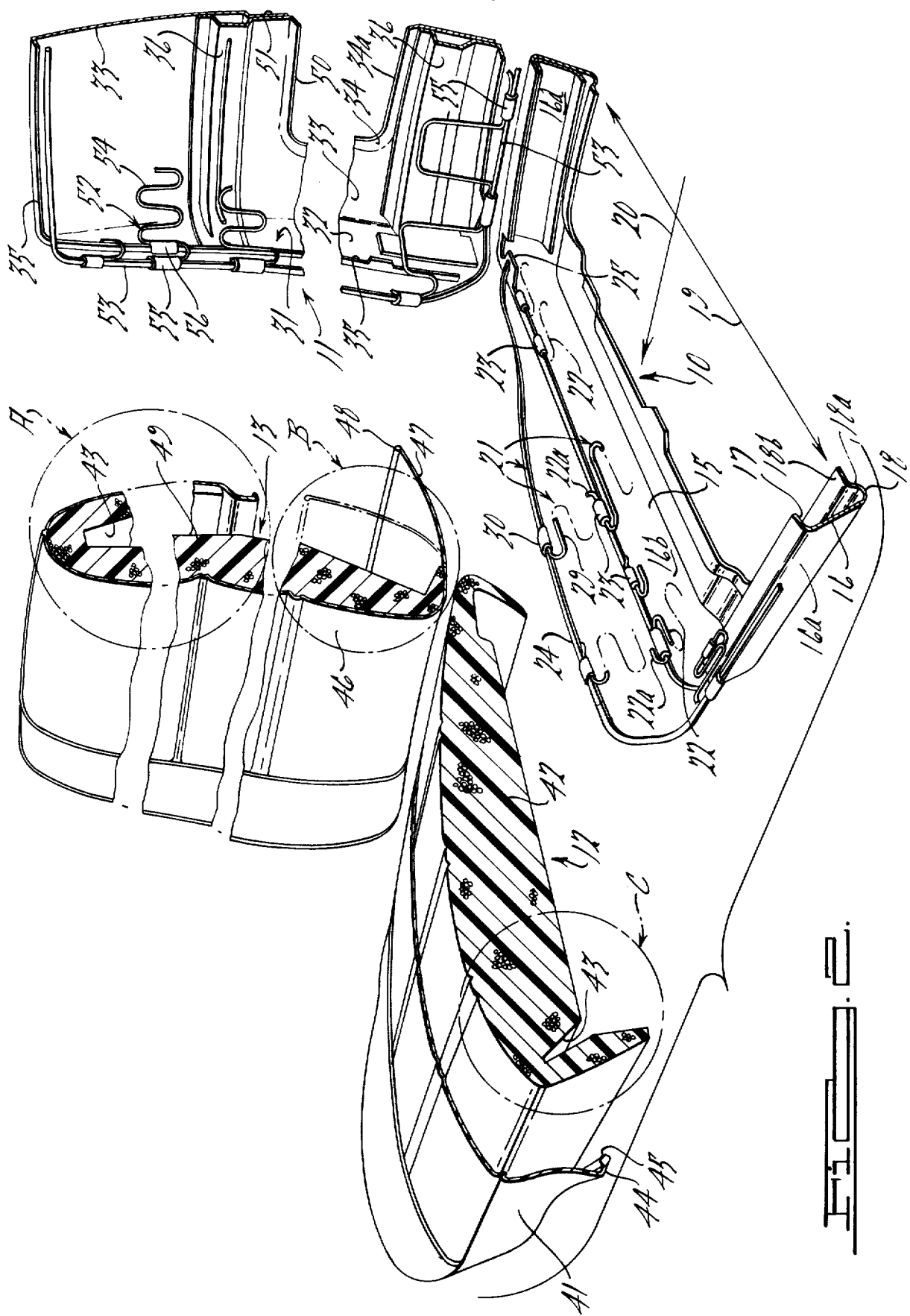

3,874,731

INJECTION MOLDED SEATING

BACKGROUND OF THE INVENTION

It is already known in the manufacture of composite articles suitable for padded structures in vehicle compartments, to use flexible polyurethane foam which can be formed within a flexible outer material. What is not known is the solution to the problem of providing a tauntness between the flexible composite materials and supporting structure to allow a high degree of resiliency during service and at the same time maintain the outer skin of the cushion in a smooth tensioned condition when relaxed.

One approach of the prior art to solve this problem has been to overstress or stretch the outer skin during the molding of the interior foam so that upon removal of the outer skin from the mold with the foam in a rigid condition, the outer skin will decrease its interior volume approximately 5% and place a normal compression stress upon the interior foam during service. This approach, of course, places a great deal of restriction on the type of materials that may be used for outer skin and does not solve all the problems relating to excessive change of shape of the cushion during service.

Another problem related to manufacture of padded structures is one which is brought about by the high-rate assembly techniques typical of the automotive Industry. Heretofore, resilient foam seating has necessitated integral embodiment of the spring supporting system or the use of penetrating fasteners to stabilize the cushion. This is not compatible with the needs of a quick snap-in type of assembly, nor compatible with a normal taunt skin for smoothness of appearance.

SUMMARY OF THE INVENTION

The principal object is to provide an improved method of making, as well as the resulting product, for a padded structure useful in an automotive vehicle compartment, the structure being characterized by a composite molded cushion adapted to be snap-fitted to an independent suspension assembly.

A feature of the method of making the padded structure comprises shaping a flexible skin material without the use of stress (to be integrated as a component of the cushion) and thereby forming a mold cavity for injection of a foaming composition—a chemical agent is introduced to the foaming mixture to provide for significant bonding strength to the vinyl skin and thereby withstand the rigors of service to be experienced by the padded structure.

Another object is to provide a padded structure and particularly an automotive seating assembly, which is characterized by: (a) a wrap-around cushion structure which, when installed, stresses the skin by tension; (b) a removable cushion structure which fits on top of a suspension assembly and is stabilized for service by a unique underside grooving in the cushion cooperating with said suspension system, and (c) a cushion contour which facilitates deflection substantially along the greatest dimension of the suspension system.

A feature of the resulting product is a padded structure particularly suited for high rate assembly such as is typical of the automotive industry. Other features comprise a unitary upholstery element having differential resilient materials, the element is defined with relatively thin deep underside grooving to receive extensions of a supporting system, and the element has an integral resilient fitting ring adapted for snap-fit installation. The grooves and extensions cooperate to stabilize the element under service, and the annular fitting ring serves to maintain the skin under slight tension to assure smooth contours when the cushion is in the relaxed condition.

SUMMARY OF THE DRAWINGS

FIG. 1 is a somewhat schematic elevational view of a seating structure for an automotive vehicle embodying the inventive aspects herein;

FIG. 2 is an exploded view, shown in perspective, of the unitary cushion elements adapted to be installed upon a suspension system, the illustration depicting the lower as well as the upright seat portions, each having certain portions broken away;

FIGS. 3-5 are views taken respectively of locations labeled A-C on the structure of FIG. 2, the cushion and supporting structure being shown in the fully assembled condition.

DETAILED DESCRIPTION

Figure 6:
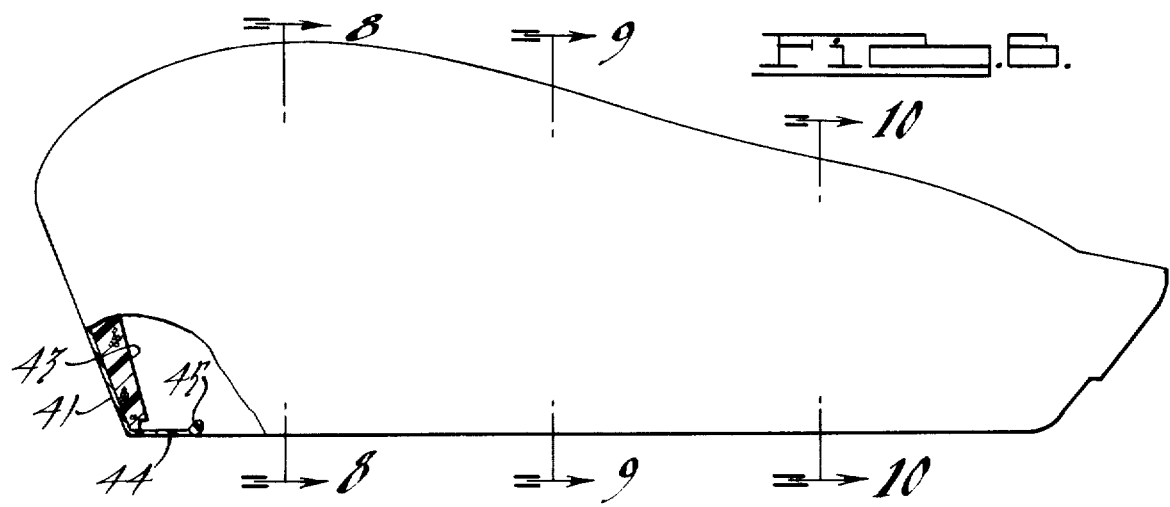
FIG. 6 is an enlarged elevational view of the horizontal seating portion of FIG. 1 with a portion broken away.
Figure 7:
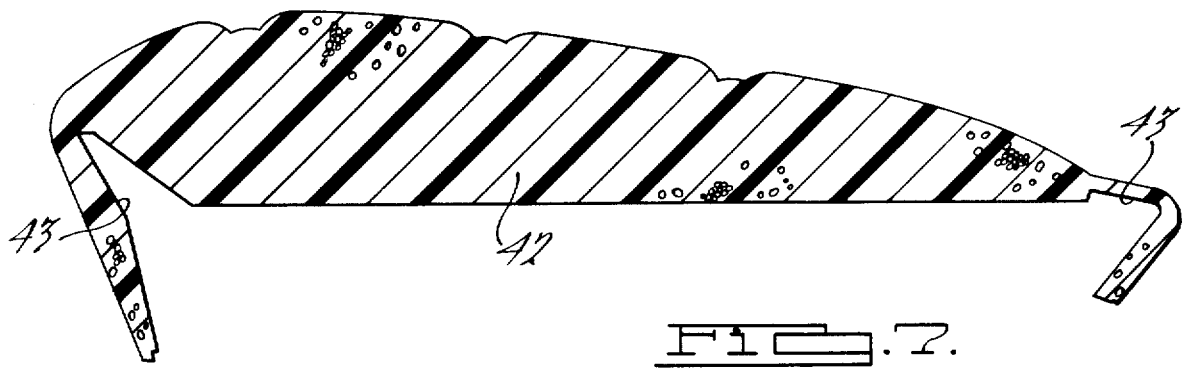
FIGS. 7-10 are sectional views taken substantially along the lines indicated in FIG. 6.

A preferred embodiment of the product or improved structure shall be described first. As shown in FIG. 1, the embodiment is adapted for use as an upholstered seating assembly for an automotive vehicle. The seating assembly is comprised essentially of four main components: a generally horizontal suspension system 10, a generally upright suspension system 11, a generally horizontally disposed cushion structure 12 and a generally upright cushion structure 13.

The horizontally disposed suspension system 10 comprises a rectangular subframe 15 defined by a stamped sheet metal channel which continues about the entire configuration. The channel, in cross section, has a generally upright wall 16 with an inwardly turned flange 17 along the upper periphery of wall 16. The lower portion of wall 16 has an inwardly turned flange 18 stepped to define a shoulder 18a and a terminating flange portion 18b. For purposes of modern automotive seat design, wall 16 may have a generally sloped arrangement so that the upper flange 17 is positioned outwardly relative to the lower stepped flange 18. The embodiment as shown in FIG. 1 is particularly adapted for a type of seating known as a "bucket" seat and has a longitudinal plan dimension 19 greater than the lateral plan dimension 20 for the subframe. The greater longitudinal dimension becomes significant in connection with the design of the cushion structure described later.

A resilient spring system 21 comprised of a plurality of serpentine shaped suspension wires 22, each made of spring steel. The serpentine springs 22 extend generally laterally across the subframe from the upper flange 17 at one side to the upper flange 17 at the opposite side of the subframe. Each suspension wire has an end 22a inserted and held within an integral hinge 23 formed from a portion of the upper flange 17 of the subframe. To define the flarred bolster portions of the bucket seat design, a bolster wire 24 of heavier guage than the suspension springs 22, is shaped to be positioned in an elevated free-form contour above the subframe. Ends 24a of the bolster wire are each secured to respective locations 25 of the upper flange 17; the bolster wire gradually rises upwardly and outwardly from location 25 and follows a path along the three sides 16a, 16b and the mirror image of side 16b for the subframe. The bolster wire 24 is maintained in a resilient raised position, as shown in FIG. 1, by way of auxiliary serpentine springs 29 having one of their ends also fastened within a hinge 23 and an opposite end fastened within auxiliary hinge 30 secured to the bolster wire at separated locations. Thus, the suspension system 10 defines a saucer support for the cushion structure to be mounted thereon. The bolster wire 24 and auxiliary springs 29 define an upwardly biased suspension side plane and the principal spring wires 22 define a generally horizontal suspension plane, both planes being designed to deflect under load in a predetermined manner.

The upright suspension system 11 is constructed substantially along the same concepts as that employed for the horizontal suspension system. In particular, the upright suspension system has a subframe 31 defining a continuous annular rectangular channel; in cross-section, the channel has a side wall 32 of lesser dimension than that utilized with the horizontal suspension system. A rear portion of the side wall 32 is turned inwardly to define an extended flange 33 terminating in an inwardly biased lip 34. The forwardly facing portion of the side wall 32 has an inwardly turned flange 35. Reinforcing ribs or supplementary channels 36 may be employed as shown in FIG. 2, extending generally laterally across the upper and lower portions of the subframe 31.

Of particular significance in both the horizontal and the upright suspension systems, is the definition of an annular terminating portion. In the case of the horizontal suspension system, the annular member is the combination of shoulder 18a said flange 18b. In the case of the upright suspension system, the annular member is the biased flange 34 having an edge 34a thereon. The annular terminating portion can be defined by other equivalent structures, but it is principally a mechanism placed at one side of the frame structure demanding that the cushion structure envelop all other sides of the suspension structure except for the space defined within the interior of the annular member. Such interior space of the annular member is not closed in the case of the horizontal suspension system 10 since it is not open to view. However, for the upright suspension system 11, the interior space of the annular member is closed by wall or board 40 complimentary to the design of wall 40.

Figure 8:
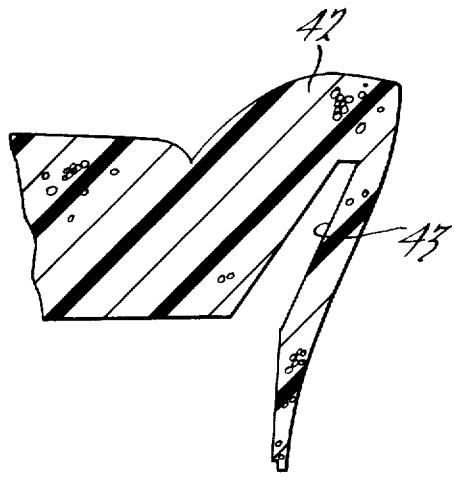
Figure 9:
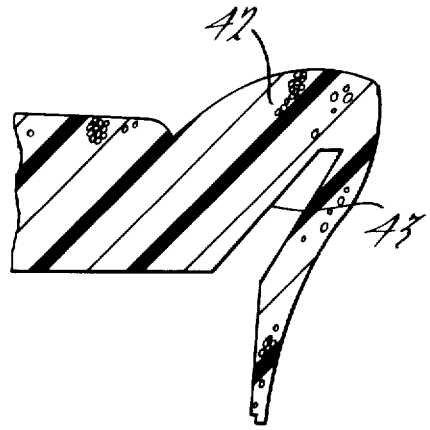
Figure 10:
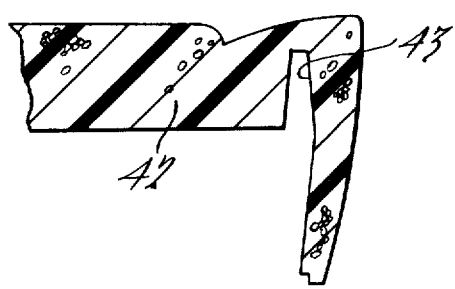

The cushion structure 12 in the case of the horizontal seating portion, comprises a polyvinyl chloride outer skin 41 and a polyurethane foam core 42 each having differential resiliency characteristics. The outer skin 41 has a substantially uniform thickness throughout, although certain sections may have increased thickness for wear and as permitted by injection molding. The skin defines an envelope having a wide opening at one side. The foam core is integrally bonded to the interior of the outer skin without the necessity of the outer skin being stressed during the molding or bonding process. Deep grooving 43 is defined in the polyurethane core in a manner to snuggly receive the extensions of the suspension systems such as the bolster wire 24 and complimentary auxiliary springs 29. The grooving extends completely around the interior of the foam core, adjacent the side walls 16. The grooving 43 has a variable height dimension which is at a maximum substantially at a location or cross section 8—8 as shown in FIG. 8. Recesses in the contour of the outer skin and in the complimentary foam core, are for purposes of appearance to simulate fabric fastening and stitching similar to that of an upholstered unit. The outer skin has an integral annular portion 44 to which no polyurethane foam is adhered. The portion 44 carries an annular integral retention ring 45 which is dimensioned to be slightly smaller in configuration than the configuration of the annular member on the suspension system. Thus upon mounting of the cushion structure against the suspension system, the retention ring 45 of the skin can be merely snap-fitted over the annular member by forcing the ring to a diameter smaller than the annular member, moving the ring inside the member, and then allowing the ring to relax. This places the skin in a somewhat tensioned condition. In addition, the polyurethane foam core is cradled by the suspension system by being received snuggly within the generally upright grooves 43 of the cushion structure.

The upright suspension system 11 has the subframe 31 arranged to carry a spring arrangement 52 which comprises a bolster wire 53 and transverse serpentine spring wires 54. A hinge 55 on the bolster wire 53 is used to fasten each end of the spring wires 54. The spring wires extend rearwardly for a short distance to become connected to flange 35 by hinges 56 integrally formed thereon. Then the spring wires extend transversely across to the opposite flange 35 and again forwardly to the bolster wire 53.

For the upright cushion structure 13, again the polyvinyl chloride outer skin forms a substantial envelope about the suspension system 46 and carries a flange 47 with no polyurethane foam adhered thereto. The terminating portion of the flange carries a retention ring or bead 48 effective to be snap-fit over the edge of member 49 along at least three sides of opening 50, and generally against the other portion 51. The polyurethane foam core is arranged to not only extend completely along the front facing side of the upright structure, but also around the top and along substantial portions of the upper back, as well as beneath the upright structure. Therefore, the cushion structure can again be characterized as extending substantially about the entire suspension system except for the interior of the annular member thereof.

METHOD

To provide an injection molded seat cushion or other padded structure, characterized by the above structural improvements, the following preferred method steps should be followed: (1) injection molding a soft pliable polyvinyl chloride skin, (2) vacuum shaping the skin seating contour, (3) injecting a foamable mixture into the shaped skin, and (4) subjecting the mixture to curing heat to form a solid foam-skin composite, and (5) mounting the composite on a previously prepared suspension system.

In greater detail the process includes:

A rigid subframe is first defined having a rectangular box-like structure comprised typically of a continuous sheet metal stamping. A box-like structure is provided for the generally horizontal seat support as well as the upright back-support. Each box-like structure is provided with a terminating flange or annular member at one side thereof (the injection molded cushion, which is adapted to sit on such subframe, will envelope or surround all sides of said subframe except for the space interior of said annular member). The subframe may be made in a variety of shapes, other than that as preferably disclosed, and may include supplementary frame structures such as overhanging wire suspensions for supporting bolsters or extensions to additional cradle and stabilize the overlayed cushion.

An outer skin or seat cover is prepared by injection molding using a soft pliable polyvinyl chloride material possessing a high wear-resistance factor with only moderate thickness in the range of 0.08 to 0.1 inches. For the horizontal seat support, the final molded polyvinyl skin is shaped to have a top and four downwardly depending side walls with an annular flange extending inwardly from the bottom of the side walls. The exterior surface of the vinyl may be given a leather appearance with simulated seams and stitches; color pigment may be introduced to the skin molding mixture or the skin may be subjected to a painting substep to achieve a desired color for matching.

The polyvinyl chloride skin is next inserted within a female mold cavity for receiving a foaming mixture. A vacuum force is applied to the flexible vinyl outer skin to draw the skin against a female mold cavity. This may be accomplished by applying a vacuum through a plurality of small orifices located on the interior surface of the female mold cavity.

Next, a cold foaming composition is prepared which is characterized by high resiliency when cured. Such a foaming composition may consist of polyurethane to which is mixed a polyvinyl adhering agent. The foaming composition may more specifically comprise a component A having an 80/20 mixture of toluene and diisocyanate. A component B is blended with component A at the time the composition is inserted into the foaming mold cavity, component B being approximately one-third of the mixture. Component B may consist of polyether polyol blend, amine chain extender including an amine catalyst and water.

To ready the molding operation for the reception of the foaming composition, a top mold portion is closed over the skin-defined mold cavity. The top mold portion has a die or protuberance to define a volume not to be filled by the foam during molding. The closed mold, when filled with the cold foam composition or mixture, is placed in an oven heated to be at approximately 150°; the foam will attain a temperature of about 125°F and it is subjected to such condition for about 10 minutes. A resilient, cellular foam structure is produced which has excellent cushion characteristics.

It is important that the mixture contain at about 2% by weight of the vinyl adhering agent in the form of elastonol polyester, the percentage is based upon the 100 parts by weight of component B. This provides excellent adhesion of the foam to the interior surface of the polyvinyl chloride outer skin which normally would not take place. The elastonol is a low acid number, narrow hydroxyl range, polyester diol.

After the foaming operation has preceded the proper amount of time, the top of the foaming mold is unlocked and the composite cushion structure is removed. It may be convenient to trim the molded cushion of any excess material. The cushion structure is then matingly mounted on the subframe in a manner so that the terminating portion of the vinyl skin carrying the integral retension ring will snap around the terminal wall of the rigid subframe.

I claim:

1. A padded vehicle seating structure, comprising:
   a. a rigid subframe having a substantially annular member at least at one side thereof, and having a flange continuously adjacent said annular member,
   b. a preformed continuous composite cushion effective to be supported by said subframe and effective to surround substantially all sides of said subframe except for the space defined within said annular member, said composite cushion being comprised of a flexible abrasion resistant skin and a solid flexible foam substrate, each being bonded to the other, said skin having a continuous annular terminating portion adjacent one side of said annular member and having a continuous depending wall extending beyond said substrate for carrying said terminating portion, said solid foam substrate being defined with a continuous groove adjacent at least three sides of said substrate and said groove opening to said one side, said subframe having portions thereof adapted to extend into and be received by said cushion groove for stabilizing same when mounted thereon, and
   c. means defining a resilient ring integral with said terminating portion of said skin and effective to grip a continuous side of said annular member opposite from said member one side, said ring means being effective to permit snap-tight mounting of said composite cushions on said subframe and having said skin arranged to permit transmission of tension forces throughout as received from said ring, said continuous depending wall being in engagement with said subframe flange adjacent said annular member.

2. The structure as in claim 1, in which the cushion has a central portion generally uniform in thickness taken in one lateral direction and partially parabolic in variation in thickness taken in a longitudinal direction.

* * * * *